(12) United States Patent
Fujino

(10) Patent No.: US 6,826,519 B1
(45) Date of Patent: Nov. 30, 2004

(54) OPTICAL PATH SIMULATION CAD SYSTEM AND METHOD

(75) Inventor: Hideki Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/577,593

(22) Filed: May 25, 2000

(30) Foreign Application Priority Data

Nov. 11, 1999 (JP) .......................................... 11/320662

(51) Int. Cl.[7] ........................... G06G 7/48; G03G 15/00
(52) U.S. Cl. ................................ 703/7; 703/6; 399/38; 399/411
(58) Field of Search .......................... 703/6, 7; 399/38, 399/411

(56) References Cited

U.S. PATENT DOCUMENTS

| | | | | |
|---|---|---|---|---|
| 3,894,787 A | * | 7/1975 | Leith et al. | .................... 359/24 |
| 4,792,694 A | * | 12/1988 | Shioya et al. | ................ 250/558 |
| 5,243,665 A | * | 9/1993 | Maney et al. | ................ 382/152 |
| 5,268,996 A | * | 12/1993 | Steiner et al. | ............... 345/426 |
| 5,668,631 A | * | 9/1997 | Norita et al. | ................ 356/608 |
| 5,984,185 A | * | 11/1999 | Dickson et al. | ............. 235/457 |

FOREIGN PATENT DOCUMENTS

| | | |
|---|---|---|
| JP | 5-210345 | 8/1993 |
| JP | 7-225790 | 8/1995 |

OTHER PUBLICATIONS

The IEEE Standard Dictionary of Electrical and Electronics Terms, 6th Edition. 1996. pp. 994–995.*
El Roy, A. et al. "Precision Single–Axis Motion Control System with Friction Compensation." Proc. Of the American Control Conf., 1995. Jun. 23, 1995. vol. 5, pp. 3299–3302.*
Disko, D. et al. "Am29000 Thermal Evaluation in Laser Beam Printer Applications, In–System Real–Time Measurements for ICC and Power Calculations". 9th Annual Semiconductor Thermal Measurement and Management Symposium, 1993 (SEMI_THEM IX). Feb. 4, 1993.*
Danzer, J. et al. "Installation and Testing of Laser Projection Imaging System for Fine–Line PCB Production". Proceedings, 52nd Electronic Components and Technology Conference, 2002. pp. 681–685.*
Kacker, D. et al. "Electrophotographic Process Embedded in Direct Binary Search". IEEE Transactions on Image Processing. pp. 243–257.*

* cited by examiner

*Primary Examiner*—Jean R. Homere
*Assistant Examiner*—Ayal Sharon
(74) *Attorney, Agent, or Firm*—Staas & Halsey LLP

(57) ABSTRACT

A model creation unit creates a three-dimensional optical model in which one or more optical components are disposed on an optical path extending from a light source to an image forming position. For creating optical axis models in the three-dimensional optical model, an optical axis auto-creation unit figures out behaviors of beams of light on the basis of predetermined set parameters. The optical axis auto-creation unit provides a display of the behaviors of beams of light in the three-dimensional optical model, for verification, and further provides a print output of letters or the like created by use of the model.

18 Claims, 16 Drawing Sheets

F I G. 6
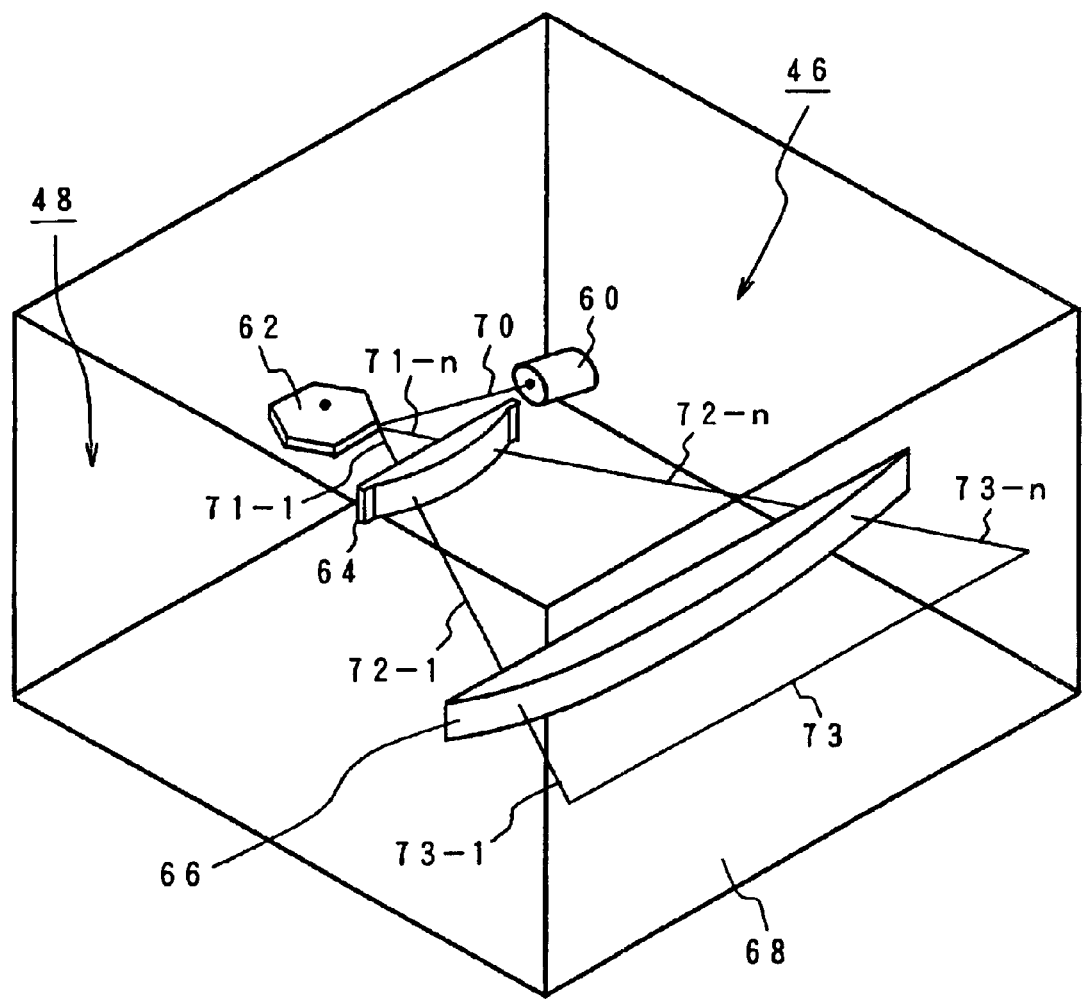

F I G. 7
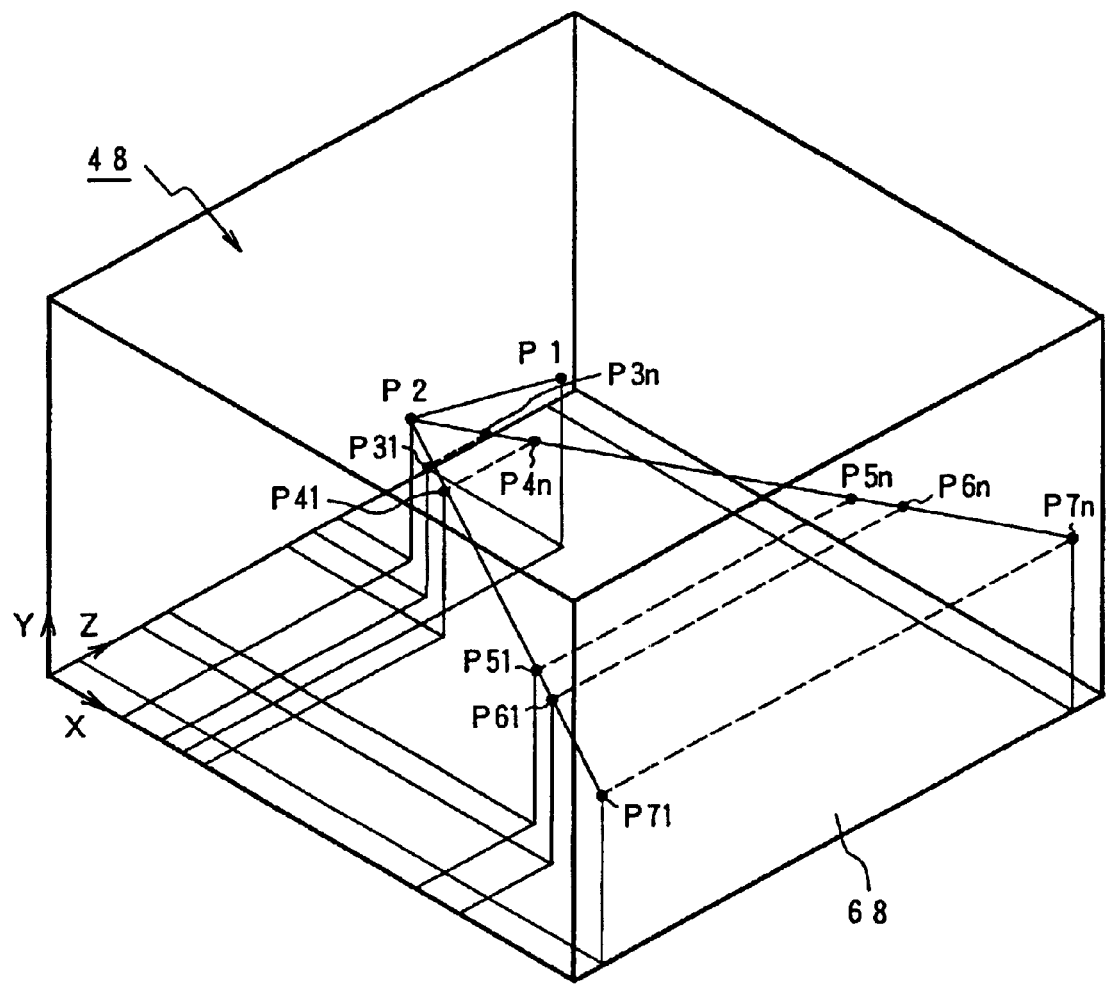

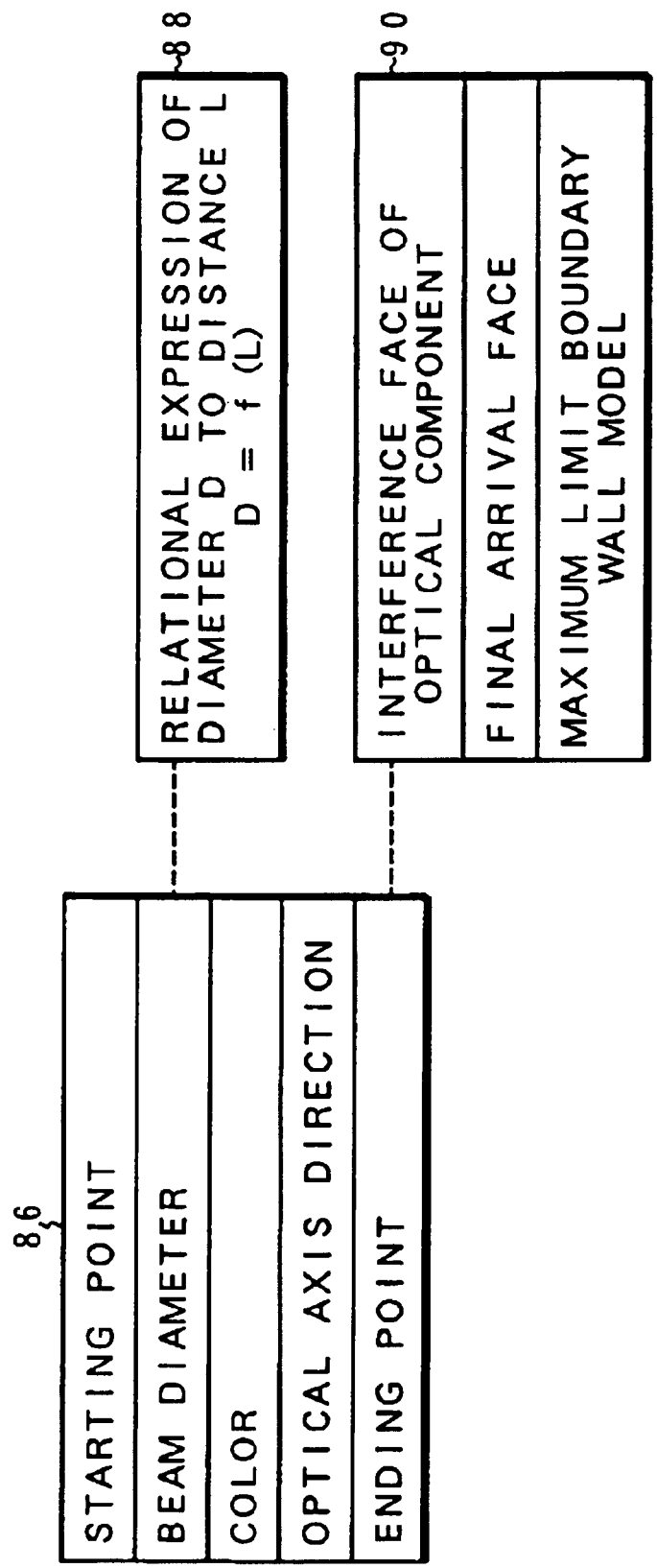

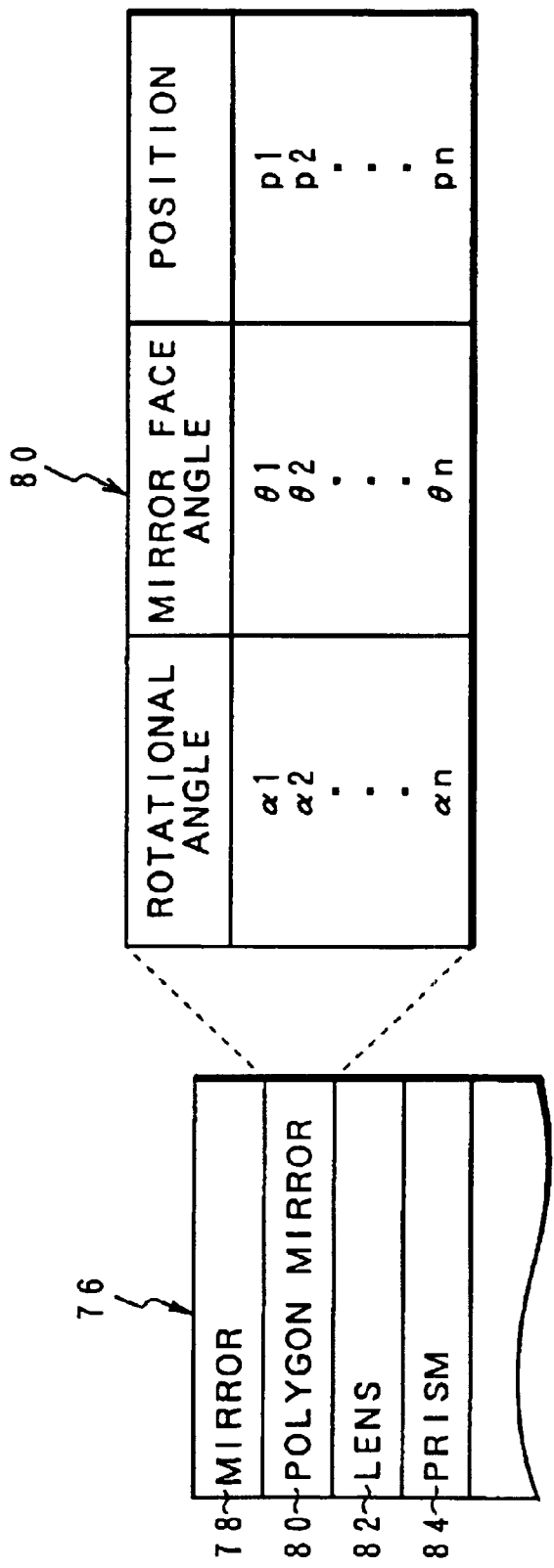

F I G. 1 2
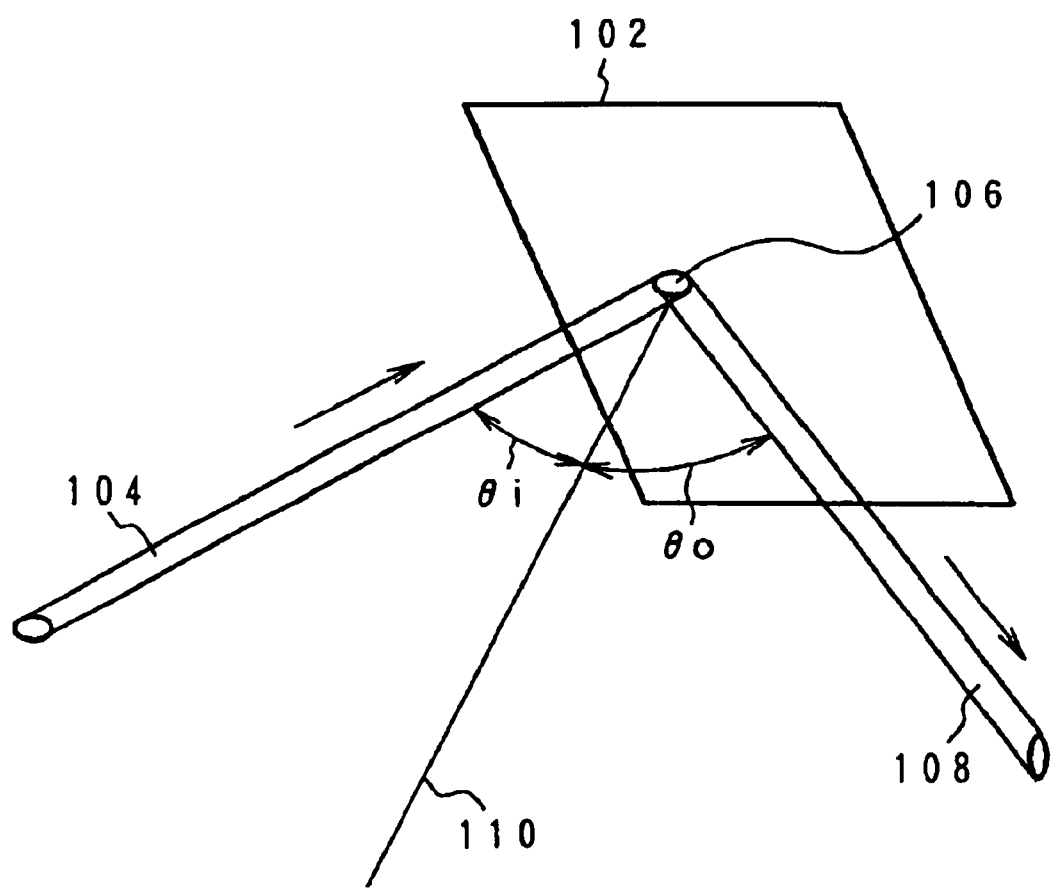

FIG. 14A
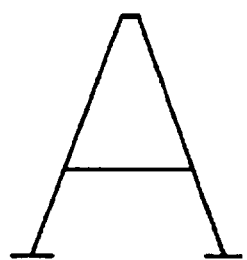
FIG. 14B
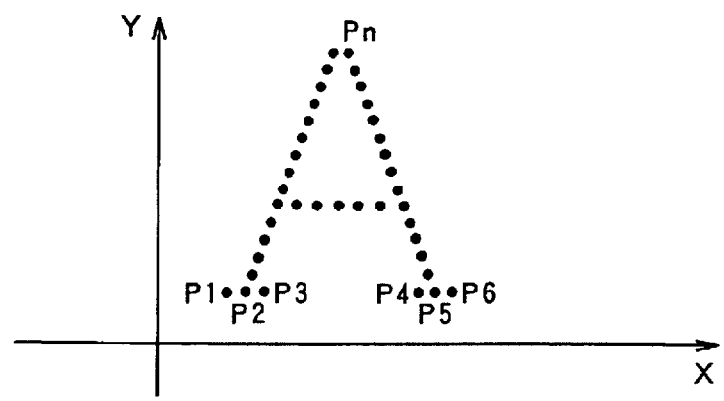
FIG. 14C
122 ARRIVAL POINT COORDINATE DATA
| | | | | | | | |
|---|---|---|---|---|---|---|---|
| X COORDINATE VALUE | x1 | x2 | x3 | x4 | x5 | x6 | x7 |
| Y COORDINATE VALUE | y1 | y2 | y3 | y4 | y5 | y6 | y7 |
| Z COORDINATE VALUE | z1 | z1 | z1 | z1 | z1 | z1 | z1 |

FIG. 15A
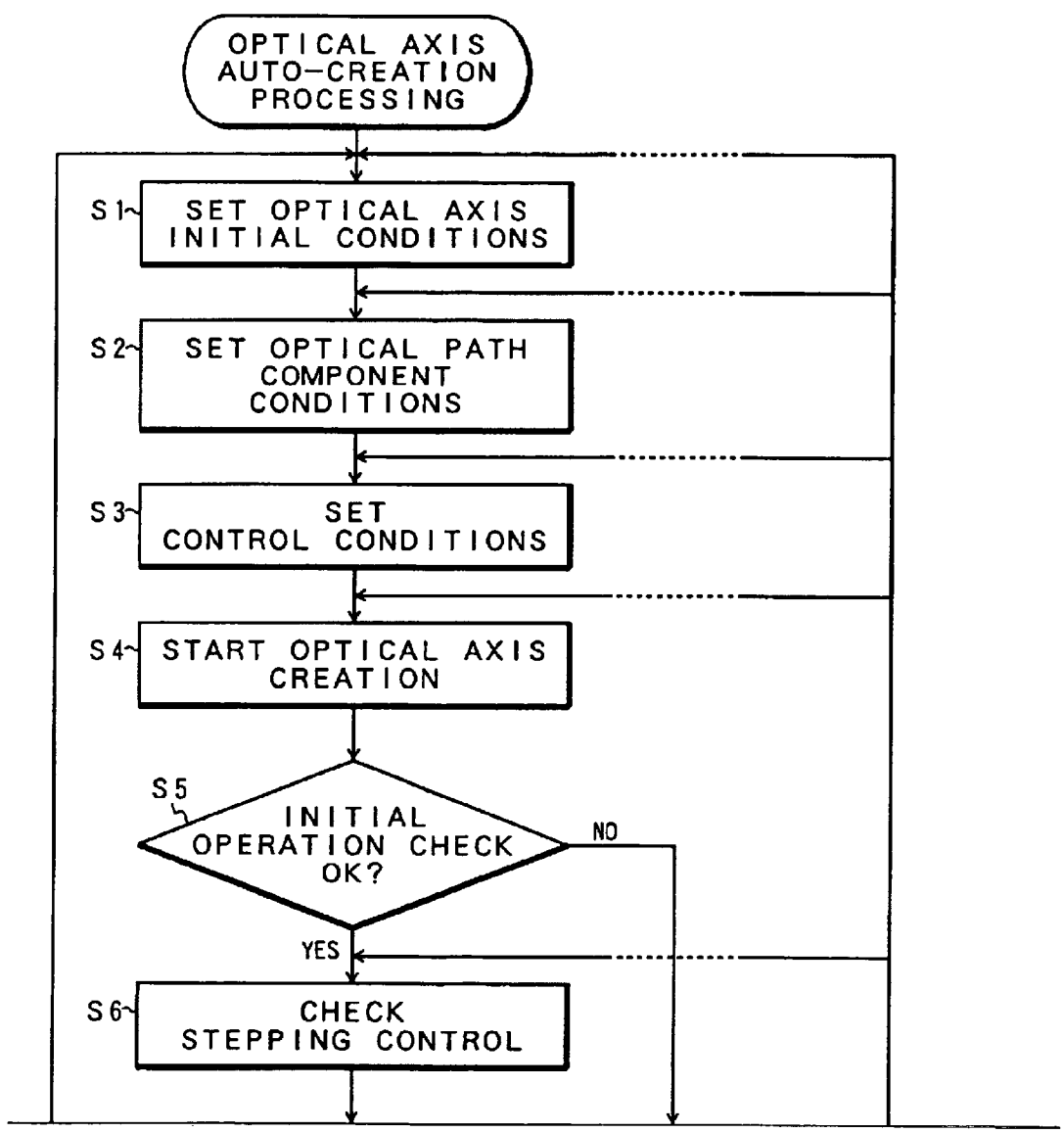

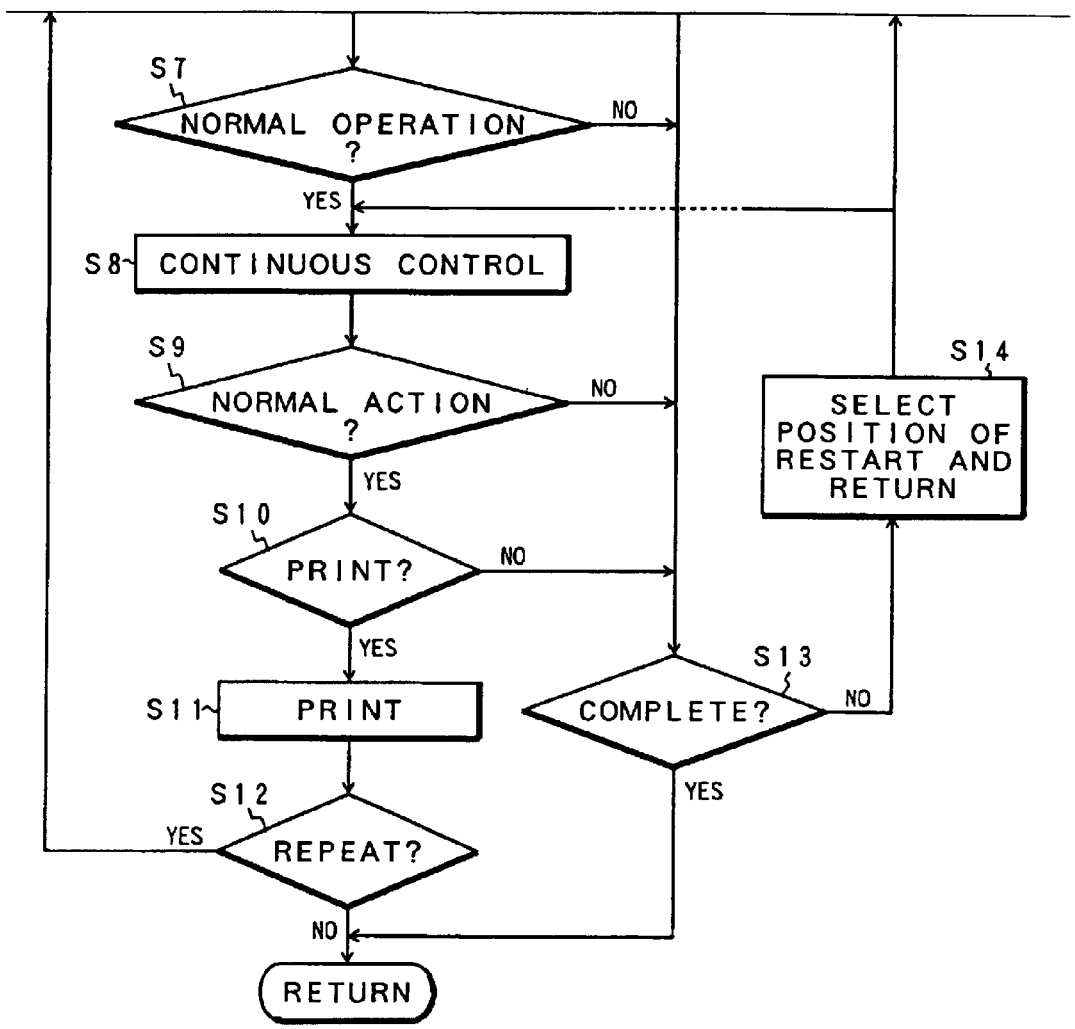
FIG. 15B

OPTICAL PATH SIMULATION CAD SYSTEM AND METHOD

BACKGROUND OF THE INVENTION

1. Field of the Invention

The present invention relates generally to an optical path simulation CAD system and method for use in the structural design of a laser printer or other apparatuses having an optical system, and, more particularly, to an optical path simulation CAD system and method capable of displaying, for verification, a trace of beams of light as it is on a three-dimensional optical model.

2. Description of the Related Arts

It has hitherto been common in the automatic computer-aided design of an optical structure used for electrophotography in laser printers, etc. to two-dimensionally convert, for examination, the behaviors of beams of light in a three-dimensional structure. More specifically, a two-dimensional drawing is created in which necessary optical components such as a polygon mirror are arranged on an optical path extending from a laser light source to a photosensitive drum providing an image forming face, to thereby define the optical path, and then verification is made of behaviors of beams of light in the three-dimensional structure while viewing the two-dimensional drawing. The designing works are thus iterated to obtain an optimum structure. In this case, for further detailed examination, a trial production is often carried out in which a pseudo structure is actually produced to form the optical path and experimented in a practical situation. Items hard to grasp through the two-dimensional examination can thereby be compensated for.

In order to precisely grasp the positions of arrangement and angles of the optical components such as a mirror within a three-dimensional space, however, the structure must be determined gradually while iterating the geometric calculations, resulting in a time-consuming work. In spite of the three-dimensional arrangement of the actual apparatus, design and examination are effected in a two-dimensional fashion, so that it is difficult and time-consuming to grasp correct behaviors of beams of light. Furthermore, due to its accumulation of human judgments and calculations, errors may often occur and the resultant design modifications and repeated trial productions may need a lot of costs and time. In addition, the trial production based verification is problematic in the accuracy due to its human intervention, with the result that repetition of the trial production may often be required.

SUMMARY OF THE INVENTION

It is therefore an object of the present invention to provide an optical path simulation CAD system and method ensuring an appropriate design and verification by three-dimensionally representing on a screen the behaviors of beams of light most approximate to the real object by use of a pseudo three-dimensional optical model in lieu of trial production.

According to a first aspect of the present invention there is provided an optical path simulation CAD system comprising a model creation unit for creating a three-dimensional optical model in which one or more optical components (a polygon mirror, an θ lens, a cylindrical lens, etc.) are disposed on an optical path extending from a light source to a final arrival position; and an optical axis auto-creation unit for figuring out optical axes indicative of behaviors of beams of light in the three-dimensional optical model on the basis of predetermined set parameters, to provide displays of the optical axes in the three-dimensional optical model, for verification. The optical axis auto-creation unit defines the optical axis diameter D and the color of a beam of light emitted from the light source, the optical axis auto-creation unit creating and arranging a cylindrical optical axis model having a length L starting from the light source and ending in an input surface of a next adjacent optical component lying on the optical path. The optical axis auto-creation unit can vary the optical axis diameter D of the optical axis model as a function of the distance from the starting point. For example, the optical axis diameter D may be reduced in inverse proportion to the distance. For the optical component(s) interposed between the light source and a final arrival position, the optical axis auto-creation unit creates output-side optical axis model(s) in conformity with optical functions of the optical component(s) from input optical axis model(s), to arrange the output-side optical axis model between the optical component and a next adjacent optical component or the final arrival position. The following is a case where for example a movable reflecting mirror (galvano mirror), the polygon mirror, a lens, etc., are used as the optical components. In case the optical component lying on the optical path is a movable reflecting mirror that is capable of swinging around a predetermined rotational axis, the optical axis auto-creation unit may be able to designate as control parameters the position of the rotational axis and the angle of a reflection surface within a three-dimensional space, the optical axis auto-creation unit automatically creating and arranging reflected optical axis models from input optical axis models on the basis of the control parameters. In case the optical component lying on the optical path is a polygon mirror that has a plurality of mirror faces formed on its periphery and that rotates at a certain angular velocity, the optical axis auto-creation unit previously may define the structures of the plurality of mirror faces, figure out the positions of the mirror faces within a three-dimensional space and the angles of the reflection surfaces from mirror rotational angles, and automatically create and arrange an optical axis model reflected on a specific mirror face from an input optical axis model. In case the optical component lying on the optical path is a lens, the optical axis auto-creation unit may previously define optical functions of the lens and automatically create an output-side optical axis model in conformity with the optical functions from an input optical axis model, to arrange the output-side optical axis model between the optical component and a next adjacent optical component or an image forming face. The optical axis auto-creation unit may provide a display of an optical axis ending point at a position where an optical axis model intersects the final arrival face, and record coordinates of the ending point into a file. The optical axis auto-creation unit may define a boundary wall model indicative of an optical axis extension limit around the three-dimensional optical model, and if the optical path has no final arrival position providing an ending point, set the position of the boundary wall model which the optical axis model intersects as an ending point of an extended optical axis model. The optical axis auto-creation unit may previously define time-sequential variations of control parameters of the optical components lying on the optical path extending from the light source to an image forming face, and allow the three-dimensional model to perform continuous actions in accordance with the time-sequential variations of the control parameters, to thereby display a desired ending point trace in the shape of, e.g., a letter or a symbol on a final arrival face and to record coordinates of the ending point into a file. In such an event, the optical axis auto-creation unit preferably converts coordinate values of the ending point coordinates recorded in the file, into dot data, for the output from a printer.

In this manner, the optical path simulation CAD system of the present invention enables the behaviors of beams of light most approximate to the real object to be three-dimensionally verified on a screen by means of a pseudo three-dimensional optical model in lieu of the trial production. In addition, all complicated calculation expressions required for the behaviors of beams of light are stored and executed on the computer, so that man-interventional portion is reduced, making it possible to eliminate various unnecessary wastes that have hitherto occurred and thus to ensure an effective design. It is therefore possible in e.g., a printer having an optical system such as a laser printer to correctly grasp the track of the beams of light emitted from the light source and passing through components such as the lens, mirror and prism, and to represent the trace of the beams of light as it is within the three-dimensional space, and to replace points on the optical path final arrival face by dots to thereby form images of arrival points of a plurality of optical paths, for the display in the shape of letters or symbols. Furthermore, in case of the printer or other printing apparatuses, it is also possible not only to display on a screen the results of image formation on the beam-of-light trace final arrival face but also to print the same, whereby a pseudo check can be made as if the print were experimentally effected by the real apparatus. This also allows, upon the optical system structure design, a pseudo verification of the optimum arrangement of the related components or of whether the output control parameters for letters or symbols are proper or not as the printing apparatus, thereby achieving a considerable saving of the costs and time.

According to a second aspect of the present invention there is provided an optical path simulation method comprising the steps of creating a three-dimensional optical model in which one or more optical components are disposed on an optical path extending from a light source to a final arrival position; and calculating optical axes indicative of behaviors of beams of light in the three-dimensional optical model on the basis of predetermined set parameters, to provide displays of the optical axes in the three-dimensional optical model, for verification. The details of the optical path simulation method are the same as those of the apparatus configuration.

The above and other objects, aspects, features and advantages of the present invention will become more apparent from the following detailed description when taken in conjunction with the accompanying drawings.

BRIEF DESCRIPTION OF THE DRAWINGS

FIG. 6 is an explanatory diagram of a three-dimensional optical model created in the present invention;

FIG. 7 is an explanatory diagram of an optical axis arrangement of the three-dimensional optical model of FIG. 6;

FIG. 10 is an explanatory diagram of data on the optical axis models of FIGS. 9A and 9B;

FIG. 11 is an explanatory diagram of an optical component characteristic library for use in the optical axis auto-creation unit of FIG. 3;

FIG. 12 is an explanatory diagram of a beam-of-light model creation on a reflection surface;

FIGS. 14A and 14B are explanatory diagrams of ending point display at the image forming face of the three-dimensional model of FIG. 6, with FIG. 14C being an explanatory view of coordinate recording; and FIGS. 15A and 15B are flowcharts of optical axis auto-creation processing in accordance with the present invention.

DETAILED DESCRIPTION OF THE PREFERRED EMBODIMENT

Figure 1:
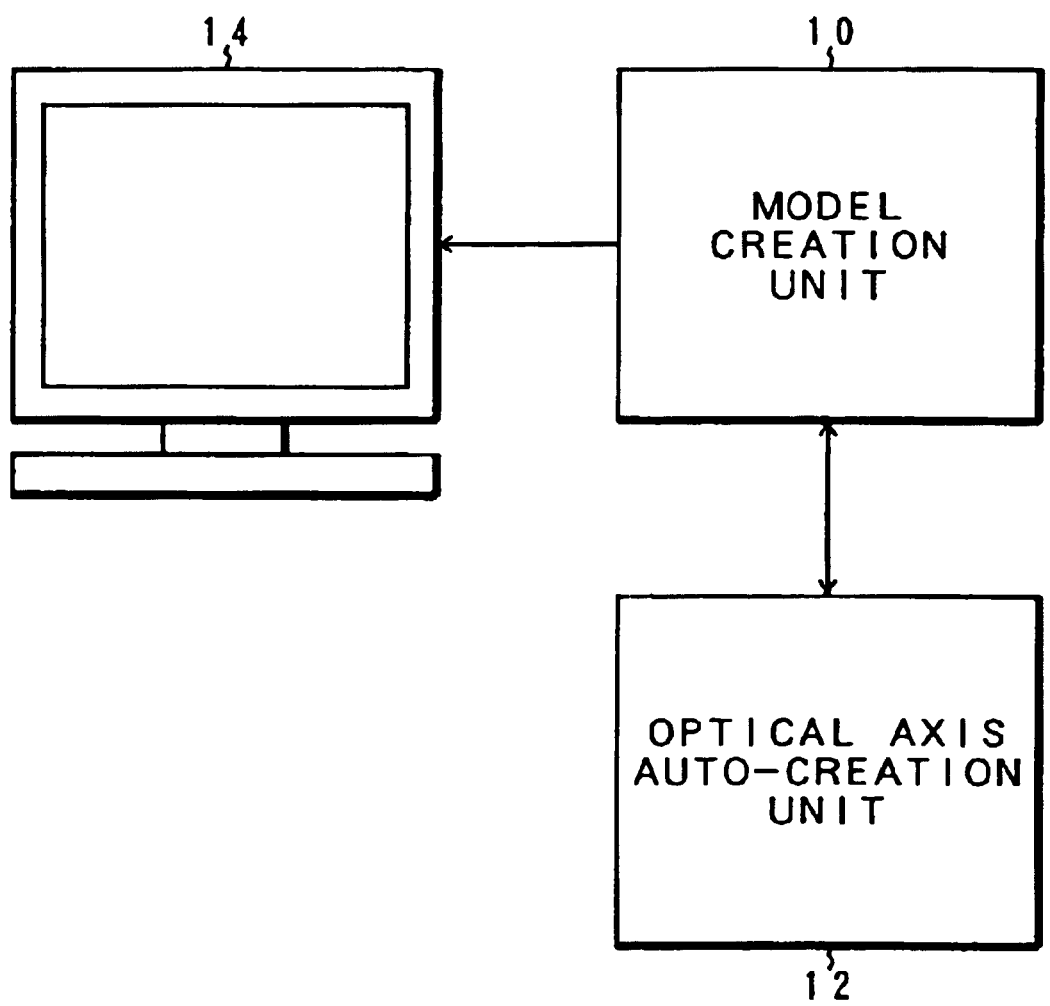
FIG. 1 is a block diagram of a system configuration of the present invention.

FIG. 1 is a basic block diagram of an optical path simulation CAD system in accordance with the present invention. The optical path simulation CAD system of the present invention comprises a model creation unit 10 and an optical axis auto-creation unit 12. By means of optical system structure design of an apparatus to be designed, e.g., a laser printer, the model creation unit 10 creates a three-dimensional optical model in which required one or more optical components are disposed on an optical path extending from a light source to a final arrival face where an optical image is formed. Concretely, the model creation unit 10 makes use of three-dimensional CAD to create the three-dimensional optical model on a display 14. On the basis of predetermined set parameters, the optical axis auto-creation unit 12 figures out an optical axis model indicating the behavior of beams of light from the light source through the optical components to the final arrival face in the three-dimensional optical model created in the model creation unit 10. The optical axis auto-creation unit 12 then provides a display of a beam-of-light model on the three-dimensional optical model to thereby allow the created three-dimensional optical model to be verified.

Figure 2:
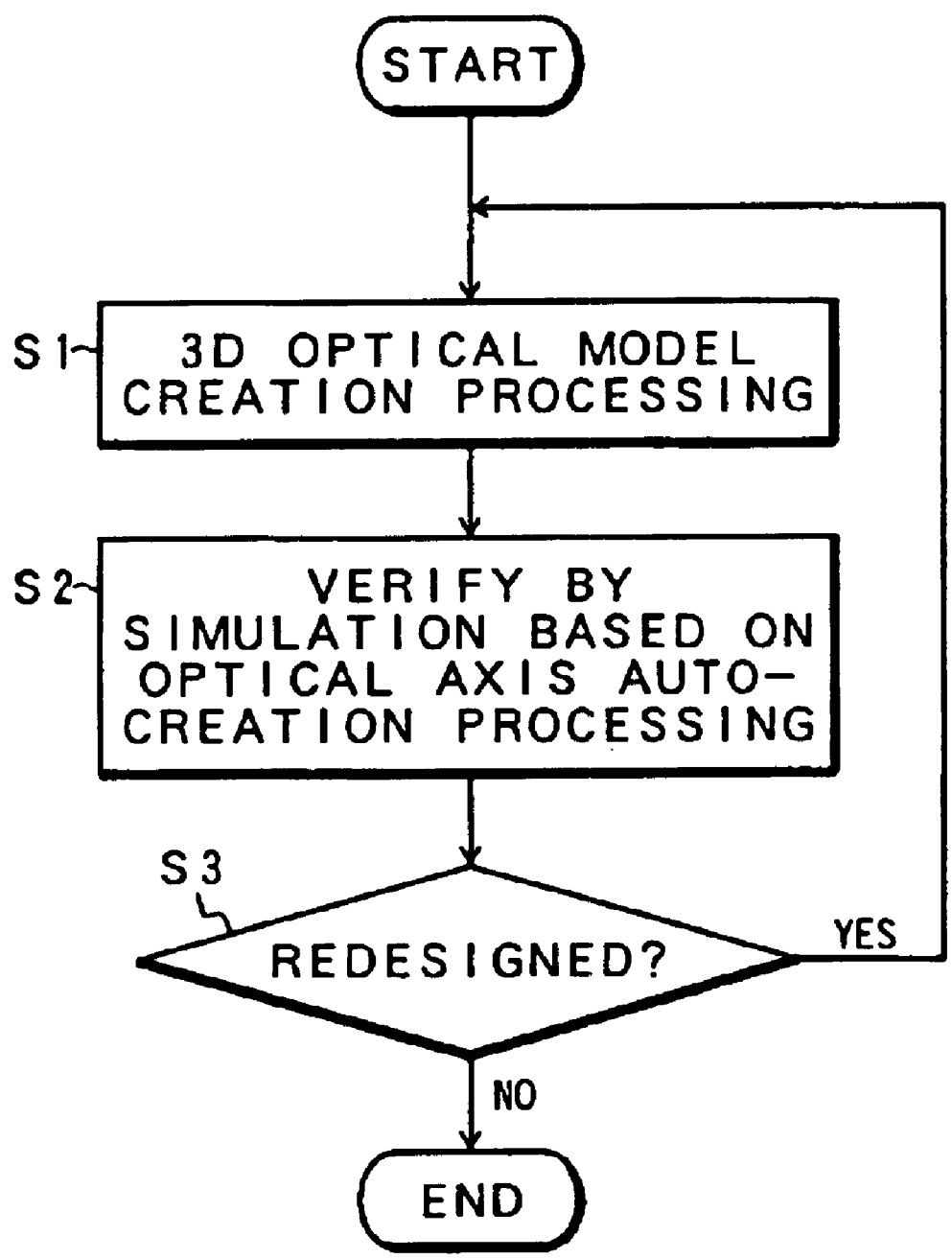
FIG. 2 is a flowchart of basic processing of FIG. 1.

FIG. 2 is a flowchart of a basic procedure in the apparatus of FIG. 1. First in step S1, a three-dimensional CAD system is used to create a three-dimensional optical model having an optical structure of the laser printer for example. Then in step S2, the three-dimensional optical model of, e.g., the laser printer is simulated with its optical axis automatically created and displayed. More specifically, a track of the optical axis is correctly captured when a beam of light emitted from the light source passes through the optical components such as a polygon mirror and lenses that are three-dimensionally arranged along the path extending to the final arrival face, whereby a trace of the beam of light can be represented as it is in the three-dimensional space. Arrival points (ending points) are displayed at positions where the optical axis intersects the final arrival face, and information on coordinates of the arrival points is recorded. For the optical components such as the polygon mirror disposed on the optical path, the amounts of variation of parameters are set and time-sequentially varied to thereby change arrival positions of the optical axis at the final arrival face for the record of arrival points, thereby effecting records with letters, symbols, etc., indicated. Furthermore, based on the record results of coordinates of the arrival points of the optical axis at the final arrival face, its forms can be printed for output. Through such verifications by simulations based on the automatic optical axis creation processing of step S2, it is possible to check in a pseudo-manner whether control parameters for the optical components are appropriate or not from the optimum arrangement of the optical components provided in the optical system and from the results of the print output. It is judged in step S3 from the results of verifications whether any redesign is needed or not. If the arrangement of the components or the result of prints is unsatisfactory, then a need for redesign is judged allowing the procedure to return to step S1 in which problematic optical components and control parameters in the simulations associated with the automatic optical axis creation are subjected to three-dimensional optical model positional regulations or to resetting of the control parameters. After such remodification of the three-dimensional optical model, simulations associated with the automatic optical axis creation processing are carried out in step S2 for the verification of the results. Such verifications are iterated through simulations based on the automatic optical axis creation processing for the creation and modification of the three-dimensional optical model or for the thus created or modified three-dimensional optical models so that the designer can utilize design functions of the three-dimensional CAD and use the three-dimensional optical model substantially equivalent to the actual apparatus without any need to actually build the apparatus by way of trial, to thereby allow regulations of such control parameters as to ensure the optimum arrangement or desired print results, thus achieving a remarkable saving of costs and time.

Figure 3:
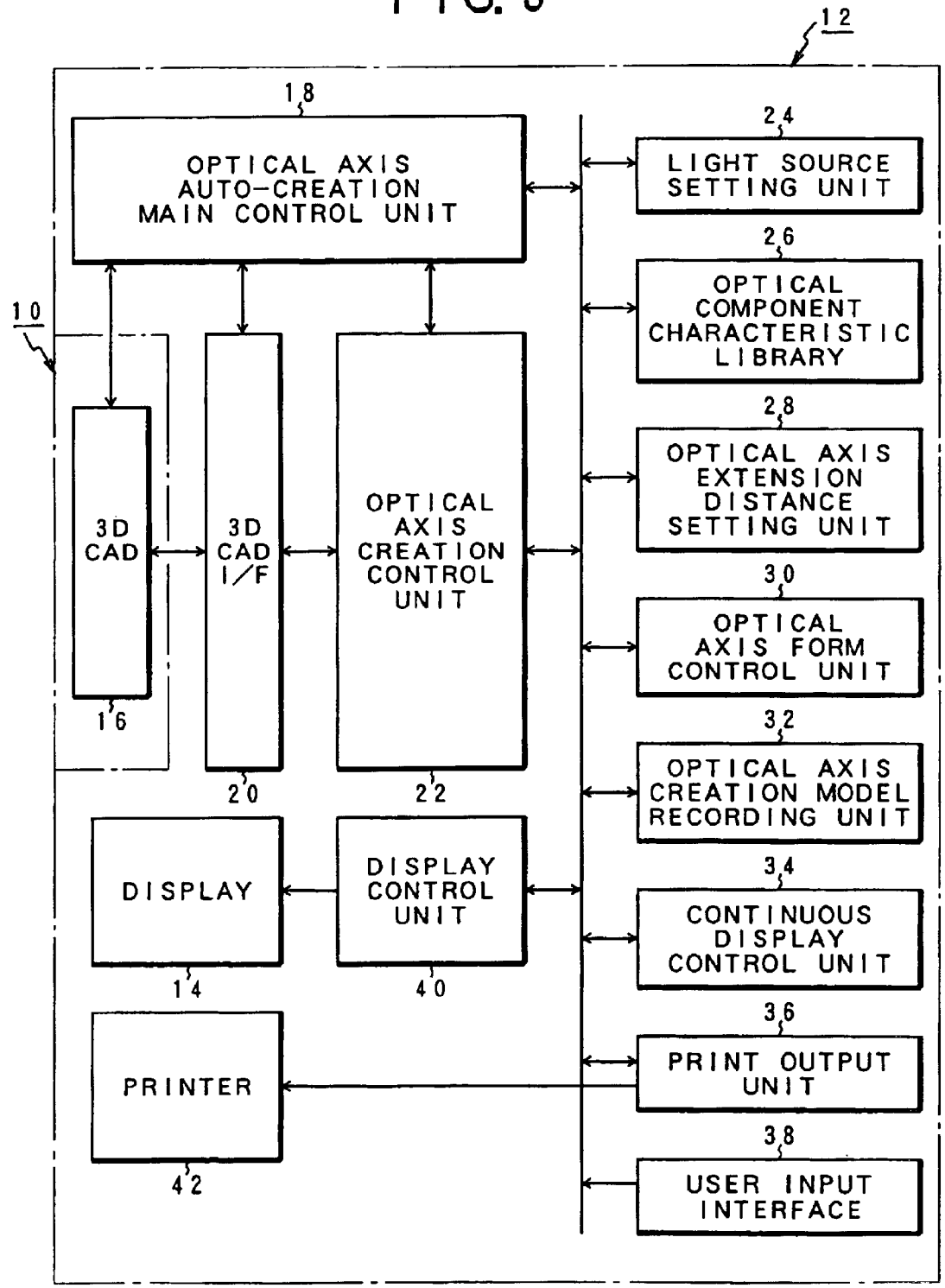
FIG. 3 is a function block diagram of an optical axis auto-creation unit of FIG. 1.

FIG. 3 is a function block diagram showing the details of the optical axis auto-creation unit 12 of FIG. 1 together with the model creation unit 10. The model creation unit 10 includes a three-dimensional CAD 16 that is capable of using a general purpose CAD system and that iterates automatic designs in which CAD system basic data are directly extracted or compiled, to thereby create a three-dimensional optical model on an existing product model for example. The optical axis auto-creation unit 12 includes an optical axis auto-creation main control unit 18 implemented by a control program, a three-dimensional CAD interface 20, an optical axis creation control unit 22, a light source setting unit 24, an optical component characteristic library 26, an optical axis extension length setting unit 28, an optical axis form control unit 30, an optical axis creation model recording unit 32, a continuous display control unit 34, a print output unit 36, a user input interface 38, a display control unit 40, a printer 42 and the display 14. Among them, the user input interface 38, display control unit 40, display 14 and printer 42 may be replaced by corresponding ones of the three-dimensional CAD 16. The optical axis auto-creation main control unit 18 serves to provide a control of the entire optical axis creating operation. The optical axis auto-creation main control unit 18 utilizes a three-dimensional optical model created by the three-dimensional CAD 16, allows the light source to generate an optical axis, extends the optical axis in a predetermined direction, recognizes an interference face when the optical axis intersects an optical component disposed midway to extract required parameters from the optical component characteristic library 26, and creates another optical axis toward an interference face of the next optical component. When the optical axes creations are complete till the final arrival face as a result of successive creations of the optical axes between the adjacent optical components in this manner, coordinates are recorded of an arrival point in the form of an intersection between the optical axis and the final arrival face so that lists or graphs can be compiled from the results of record of a trace with time-sequential variations of the arrival point or so that if needed the trace of the arrival point can be converted into dot data for print. Then, after creations of a plurality of different optical axis models based on variations in the angle of output from the light source and based on variations in the parameters of the polygon mirror, etc., lying on the optical path, control is provided such that for example all traces of the optical axis models are regenerated in an animated fashion in conformity with a predetermined procedure of operations. The three-dimensional CAD interface 20 is an interface for interchanging data with the three-dimensional CAD 16. The three-dimensional CAD interface 20 feeds defined results of three-dimensional optical model creating conditions from the optical axis auto-creation unit 12 to the three-dimensional CAD 16 and fetches into the optical axis auto-creation unit 12 three-dimensional coordinate data on various optical components such as reflecting mirrors, lenses and prisms that are existing models lying in the three-dimensional CAD 16, to utilize them for edit in the optical axis creations. For the three-dimensional optical models created in the three-dimensional CAD 16, the optical axis creation control unit 22 forms definite optical axis model data after edit based on conditions such as coordinates for the display of the optical axis models starting from the light source, shapes and directions of travel such as straightforward travel and refraction. The optical axis creation control unit 22 then delivers the thus formed data to the three-dimensional CAD 16 by way of the three-dimensional CAD interface 20. The light source setting unit 24 serves to define the characteristics of an optical axis issued from the light source provided in the three-dimensional optical model and determines the diameter, color, direction, etc., of the optical axis in an interactive fashion with the three-dimensional optical models in the three-dimensional CAD 16. The optical component characteristic library 26 records in the form of detailed library data their respective characteristics of the optical components with which the optical axes used in the three-dimensional optical models interfere. The optical components can include for example a single reflecting mirror, lens, prism, polygon mirror, etc., and, as their objects of edit, are each provided with control parameters for determining the behavior of an output optical axis when the optical axis impinges on each optical component. The optical axis extension length setting unit 28 serves to previously set the extension lengths of optical axis models created in the optical axis creation control unit 22. In order to prevent the optical axis models from being created infinitely if there lies no optical component on the extension of the optical axis, the optical axis extension length setting unit 28 sets a maximum limit boundary wall model indicative of the maximum optical axis extension length. The optical axis form control unit 30 is used when the optical axis model is formed from a cylinder that has a starting point and an ending point and the optical axis diameter of the optical axis model needs to be precisely varied. Since optical axis diameter edit parameters are previously contained in the optical component characteristic library 26, the optical axis form control unit 30 refers to the optical axis diameter edit parameters for editing and delivers the result to the optical axis creation control unit 22. In case for example the optical axis diameter is varied precisely as a function of the distance, the optical axis form control unit 30 acquires an expression for calculating variations of the optical axis diameter relative to the distance from the optical component characteristic library 26 and edits the variations of the optical axis diameter relative to the distance based on the result of calculations, to deliver the result to the optical axis creation unit 22. The optical axis creation model recording unit 32 records all information on an optical axis model issued from the light source, optical axis models disposed between adjacent optical components arranged along the optical path and an optical axis model disposed between the last optical component and the final arrival face, and stores them into predetermined files. By storing into the files a series of optical axis models from the light source to the final arrival face for use in the optical axis display of the three-dimensional optical models in this manner, it is possible to reproduce the results of optical axis creations as needed even after the processing by the optical path simulation CAD of the present invention has once been completed and to save the processing time as compared with the case of performing new processing upon the improvement of the apparatus or upon the creation of different models.

After creations and verifications of a plurality of optical axis models from the light source to the final arrival face, the continuous display control unit 34 arranges in sequence the plurality of optical axis models between the light source of the three-dimensional optical model and final arrival face, i.e., between the light source and the adjacent optical component, between the two adjacent optical components and between the last optical component and final arrival face, to thereby allow traces of the optical axes to be continuously displayed in the three-dimensional model on the screen of the display 14 provided by the three-dimensional CAD 16. The resultant continuous display of the optical axis traces is used for, e.g., verification of the optical structure of the three-dimensional optical model. Furthermore, by virtue of the continuous display of the plurality of optical axis models from the light source to the final arrival face in a continuous display mode, it is possible to display the traces of the optical axes from the light source to the final arrival face in an animated manner. The print output unit 36 is used when printing together three-dimensional coordinate data on the trace of the optical axis arrival point at the final arrival face and information on the optical components by use of the printer 42. In cases where images of letters or symbols have been formed on the final arrival face for example, it is possible to create dot data from the three-dimensional coordinate data obtained as results of record of those traces and to print the letters or the symbols at a predetermined magnifying power.

Figure 4:
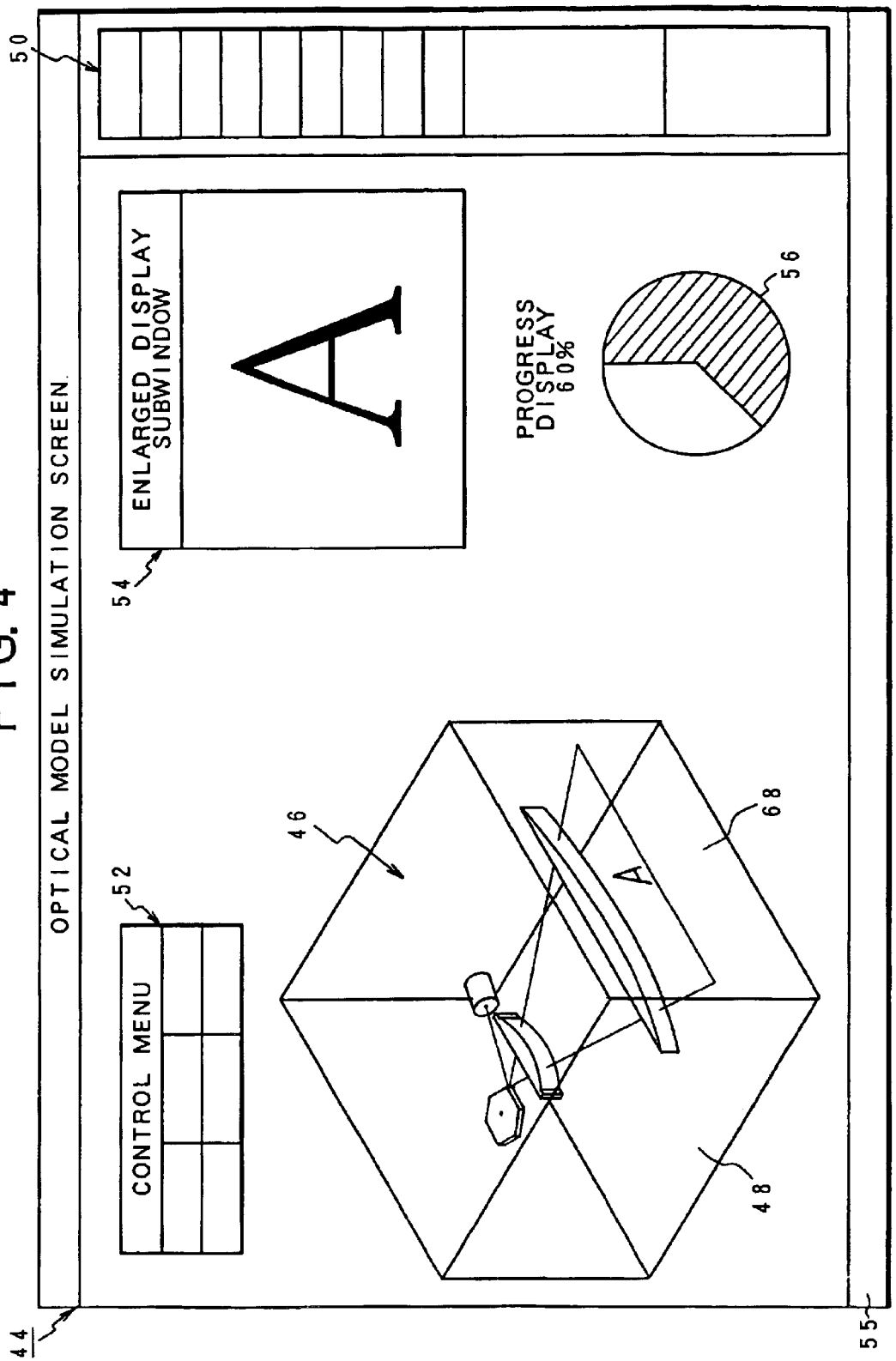
FIG. 4 is an explanatory diagram of an optical system simulation screen in accordance with an embodiment of FIG. 3.

FIG. 4 illustrates an example of an optical model simulation screen appearing on the display 14 of the optical path simulation CAD system of the present invention. The optical model simulation screen is generally designated at 44 and, at its left hand, provides a display of a three-dimensional optical model 46 created by the three-dimensional CAD 16. In this embodiment the three-dimensional optical model 46 is in the form of an optical structure of a laser printer by way of example. The three-dimensional optical model 46 is arranged in the three-dimensional space within an apparatus frame 48. The optical model simulation screen 44 is provided with an operation menu 50, a control menu 52, an enlarged display subwindow 54, a message display unit 55 and a progress display unit 56. The operation menu 50 provides a display of a menu for effecting simulations of the three-dimensional optical model 46 in a picturesque manner with respect to the three-dimensional optical model. The control menu 52 provides a display for giving, e.g., an instruction of stepping or continuous control of simulations and an instruction of selection upon the occurrence of any abnormality. The enlarged display subwindow 54 provides an enlarged display of results of image formation of letters, symbols, etc., at the light beam final arrival face in the three-dimensional optical model 46. The message display unit 55 provides a display of a message for guiding the next operation in accordance with a process or of a message upon the occurrence of any abnormality. The progress display unit 56 provides a display of the degree of progress of the simulations. The progress display unit 56 automatically figures out the current throughput on the basis of, e.g., the number of refractions for optical axis shifting or of the number of repetitions which are previously defined, to thereby display the degree of progress in the form of a circle graph for example.

Figure 5:
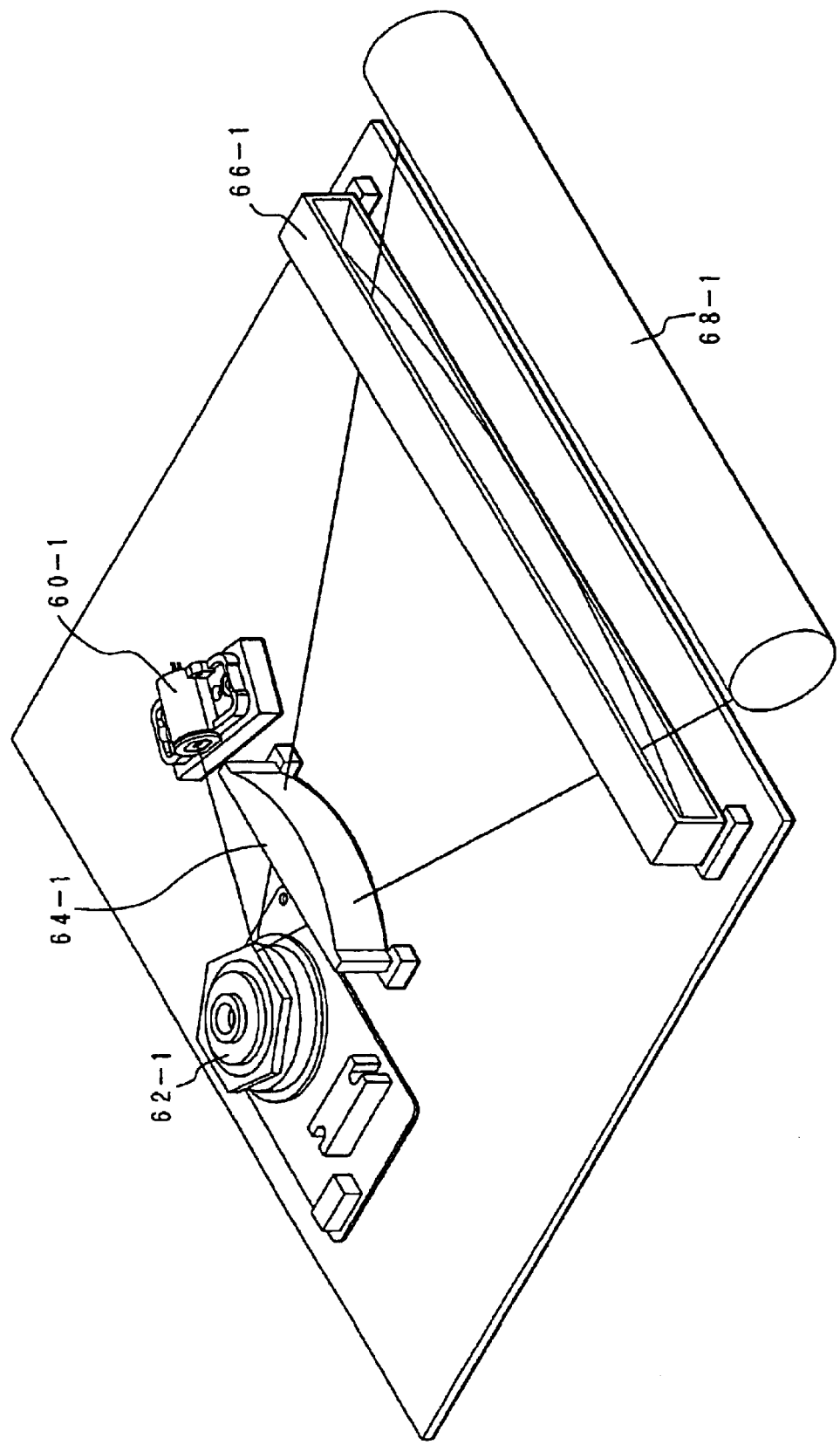
FIG. 5 is an explanatory diagram of a laser printer optical unit to be designed.

FIG. 5 is an explanatory diagram of a laser printer optical system having the optical structure of the three-dimensional optical model appearing on the optical model simulation screen 6f FIG. 4. The laser printer optical system is constructed from a light source 1 unit 60-1 for emitting a laser beam, a polygon mirror 62-1 rotating at a certain angular velocity for horizontally scanning the laser beam from the light source unit 60-1, an θ lens 64-1 receiving the scanning beam from the polygon mirror 62-1 for correcting aberrations for example, a cylindrical lens 66-1 for equalizing the horizontal velocities of the beam horizontally scanned by the polygon mirror 62-1, and a photosensitive drum 68-1 on which the beam scanned by the polygon mirror 62-1 is image formed in alignment. For the structural design of such a laser printer optical system, the three-dimensional optical model 46 as shown in FIG. 6 is created by means of the three-dimensional CAD 16 of FIG. 3. That is, the laser printer optical system is constructed from a light source 60, a polygon mirror 62, an θ lens 64, a cylindrical lens 66, and a final arrival face 68 corresponding to the photosensitive drum 68-1 of FIG. 5. Herein, the three-dimensional optical model 46 is delimited by a frame model 48. The final arrival face 68 lies on one of surfaces of the frame model 48. In FIG. 6 there is shown the state of continuous display of a plurality of optical axis models from the light source 60 to the final arrival face 68 which have been created by the optical axis creation unit 12 of FIG. 3. To this end, the optical axis models are constructed from an optical axis model 70 extending from the light source 60 to the polygon mirror 62, a plurality of optical axis models 71-1 to 71-$n$ extending between the polygon mirror 62 and the f θ lens 64 and obtained through the rotational scanning of the polygon mirror 62, a plurality of optical axis models 72-1 to 72-$n$ extending between the θ lens 64 and the cylindrical lens 66, and a plurality of optical axis models 73-1 to 73-$n$ extending between the cylindrical lens 66 and the final image forming face 68. Such a continuous display of a plurality of optical axis models from the light source 60 to the final arrival face 68 allows the state of the optical path induced by rotations of polygon mirror 62 in the three-dimensional optical model 46 to be verified at a glance. In case the light source 60 is lit at all times for example, the final arrival face 68 can display a most-recent trance 73 as the trace of the arrival points of the optical axis models 73-1 to 73-$n$ that vary in the positive direction.

In the actual optical system of FIG. 5, the photosensitive drum 68-1 providing the final arrival face is rotated in conjunction with the rotations of the polygon mirror 62-1. For this reason, in the three-dimensional optical model 46 of FIG. 6, the final arrival face 68 is displaced upward for example at a predetermined pitch in synchronism with the rotational scanning of the polygon mirror 62 for example, thereby allowing the final arrival face 68 to display traces of letters or symbols under the light emission control of the light source 60.

FIG. 7 illustrates exclusively points for optical axis creations in the three-dimensional optical model 46 of FIG. 6. An optical axis first starts from a light source starting point P1 and strikes on a reflecting point P2 of the polygon mirror 62. The optical axis from the reflecting point P2 experiences horizontal variations in the angle of reflection depending on the rotations of the polygon mirror 62 and has input points P31 to P3n on the θ lens that follows. Then respective optical axes have output points P41 to P4n on the θ lens 64. Subsequently, the optical axes have input points P51 to P5n on the cylindrical lens 66 and then have output points P61 to P6n thereon. Ultimately, the optical axes reach final arrival points P71 to P7n on the final arrival face 68. Therefore, in order to display the trace of the optical axis from the light source starting point P1 up to the final arrival point P71 for example, it is necessary to create and continuously display a total of four optical axis models between P1 and P2, between P2 and P31, between P41 to P51 and between P61 and P71. Furthermore, for optical axis displays required for operations of the actual laser printer, (1+3×n) optical axis models need to be created where n is the number of dots at the final arrival points. FIG. 7 shows X, Y, Z coordinates of the points P1 to P7n in the three-dimensional space. In case of the light source starting point P1 for example, its Y-axis coordinate value is the length of a perpendicular line toward X-Z plane, with its X-axis coordinate value being the distance from the intersection of the perpendicular line to Z-axis, and with its Z-axis coordinate value being the distance from the intersection of the perpendicular line to X-axis. The same applies to the reflecting points and to the final arrival point.

Figure 8:
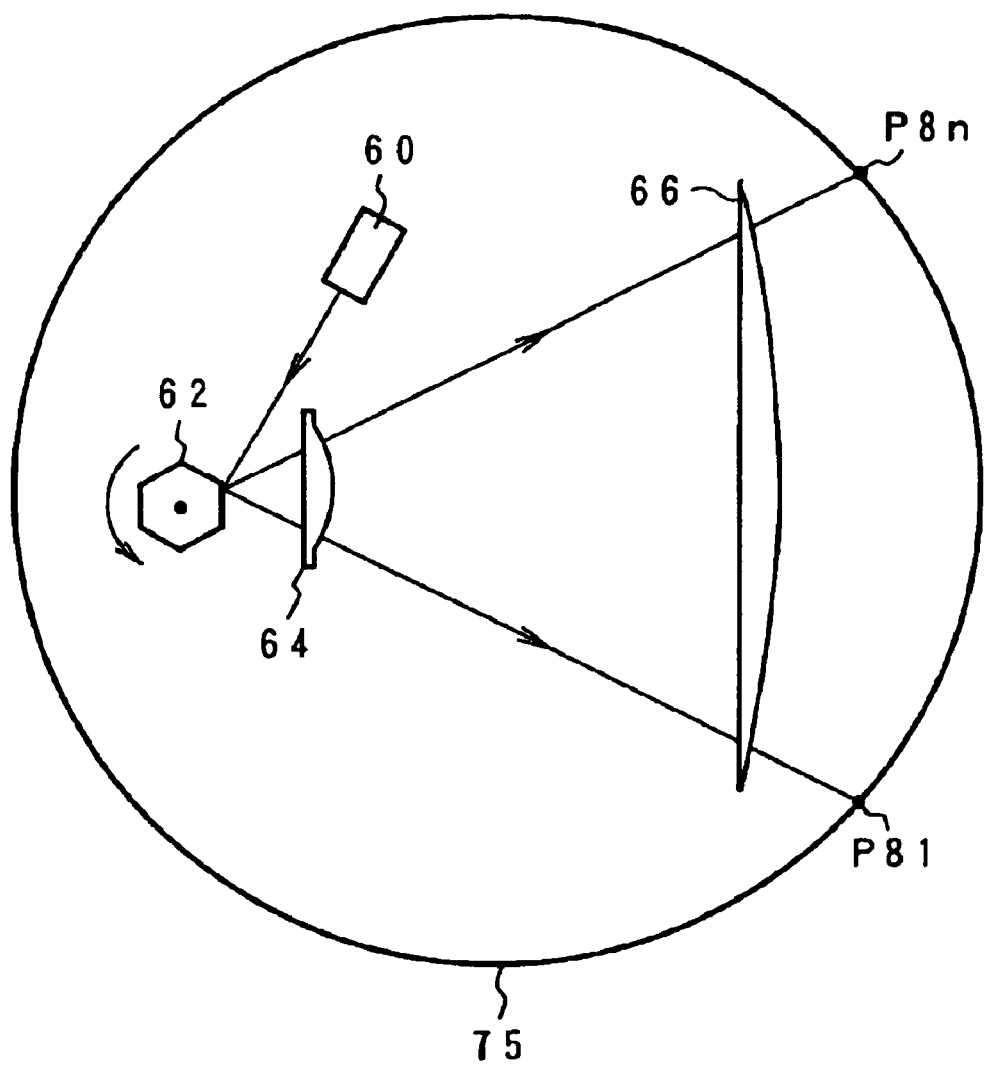
FIG. 8 is an explanatory diagram of a maximum limit boundary wall model set in the three-dimensional optical model.

FIG. 8 is an explanatory diagram of the limit of the optical axis extension length upon the creation of the optical axis models in the three-dimensional optical model of the present invention. At the stage of initial design of an optical structure of the laser printer for example by use of the three-dimensional CAD 16, it is difficult in the present invention to determine the apparatus frame model 48 as shown in FIG. 7, so that the three-dimensional optical model 46 is created in an open three-dimensional space without the apparatus frame model 48 so as to carry out simulations by the optical axis automatic creations. In this event, an optical axis from a certain optical component can extend infinitely unless the other optical components lie on its extension, which may result in erroneous calculation processing. Thus, as shown in FIG. 8, a maximum limit boundary wall model 75 is provided in the form of a sphere for example around the three-dimensional optical model 46 to create the optical axes. This provides intersections P81 to P5n with the maximum limit boundary wall model 75 to prevent the optical axes passing through the cylindrical lens 66 from being further extended outwardly although the optical axes passing through the cylindrical lens 66 would otherwise extend infinitely, whereby it is possible to set the ending points on the boundary model to finite distances in spite of the open space.

Figure 9A:
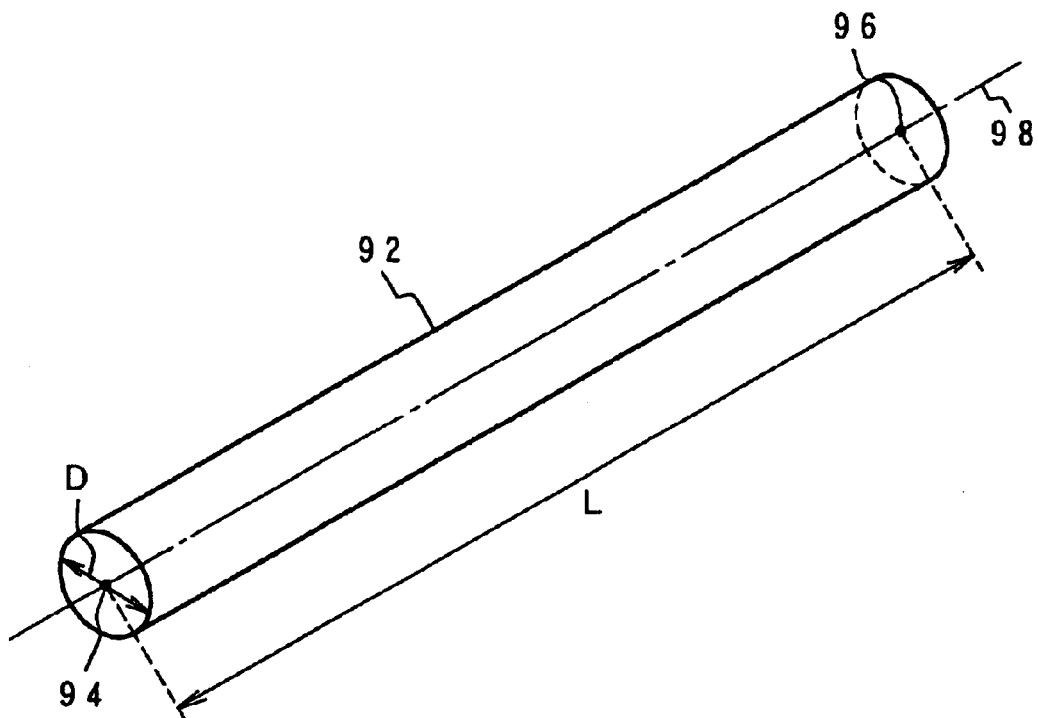
FIGS. 9A and 9B are explanatory diagrams of optical axis models created in the present invention.
Figure 9B:
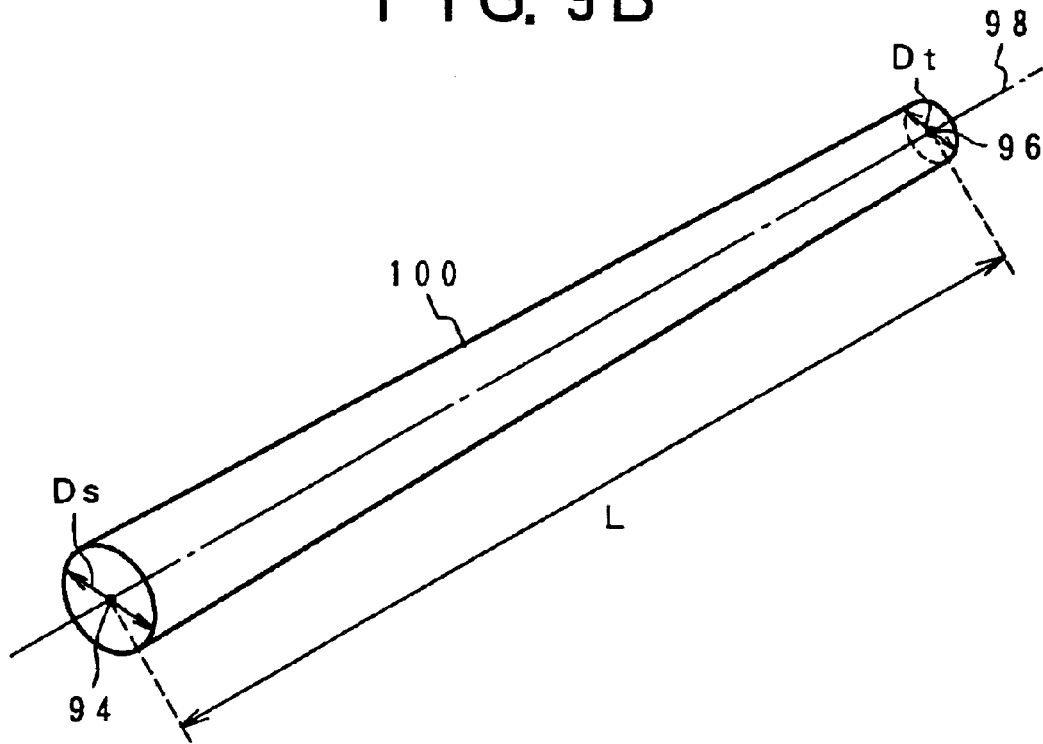

FIGS. 9A and 9B are explanatory diagrams of an optical axis model created by the optical axis auto creation unit 12 of FIG. 3. FIG. 9A illustrates a basic optical axis model 92 that is defined by the optical axis diameter D, the color and the direction of optical axis that are set in the light source setting unit 24. First, determination is made of a starting point 94 from which an optical axis is generated and on which the set optical axis diameter D is arranged. Then, determination is made of an optical axis 98 which extends from the starting point 94 in a predetermined direction so that a cylinder with the optical axis diameter D is extended along the optical axis 98. An ending point 96 is then determined that is a point where the extension of the cylinder impinges on the interference face (input face) of another optical component. An optical axis model 92 can thus be created that has a length L from the staring point 94 to the ending point 96. Such a basic optical axis model 92 is created in sequence from the light source 60 in case of the three-dimensional optical model 46 of FIG. 6 for example. The basic form of the optical model is thus determined by the diameter, the color and the direction of the optical axis that are set in the light source setting unit 24 of FIG. 3.

FIG. 9B illustrates another optical axis model 100 whose optical axis diameter D decreases accordingly as the length of the optical axis model 100 increases. That is, depending on the light source or the optical components there could be created optical axis models whose optical axis diameters emitted are increased or decreased as functions of variations of their lengths. An expression for calculating the variance of the optical axis diameter D relative to the length L of the optical axis model 100 is stored as one of the control parameters for the optical components in the optical component characteristic library 26. The calculation expression is read by the optical axis form control unit 30 in use so that there can be created the optical axis model 100 whose optical axis diameter varies from Ds to Dt relative to the length L as seen in FIG. 9B for example.

FIG. 10 is an explanatory diagram of a data structure of the optical axis model generated as illustrated in FIGS. 9A and 9B. Optical axis model data 86 include starting point, optical axis diameter, color, direction of optical axis and ending point. With respect to the optical axis diameter among them, reference may be made to a calculation expression 88 to obtain an optical axis diameter that varies relative to the length L as in FIG. 9B. The ending point can be any one of the interference face of another optical component for optical axis given as ending information, the final arrival face, and the maximum limit boundary wall model that has been set as in FIG. 8.

FIG. 11 is an explanatory diagram of the optical component characteristic library 26 of FIG. 3. This optical component characteristic library 26 stores therein characteristic library data in the form of mirror 78, polygon mirror 80, lens 82, prism 84, etc. In case of an immovable mirror, the mirror 78 allows setting, as fixed parameters, of center coordinates (x, y, z) of a mirror face reflecting point within a three-dimensional space as well as an angle 0 of the mirror face. In case of a movable mirror such as a galvano mirror, the parameters can be the center coordinates (x, y, z) of the mirror axis within the three-dimensional space and the angle of the mirror face which are externally settable.

FIG. 12 illustrates an optical axis model 104 which, from the direction of the arrow, strikes on a reflection surface 102 arranged at an arbitrary location in the three-dimensional space. The location of the reflection surface 102 at that time is defined by coordinates (x, y, z) of a point of reflection 106 and an angle θ of the mirror face that are known from the library data, so that an input angle $θ_i$ can be figured out by drawing a perpendicular line 110 to the point of reflection 106. Therefore, a reflection angle θ, relative to the point of reflection 106 is set to be equal to the input angle $\theta_i$, and an optical axis model 108 is automatically created with the reflection angle $\theta_o$ as to pass through a plane that is orthogonal to the reflection surface 102 and that contains the optical axis model 104 and the perpendicular line 110.

Figure 13:
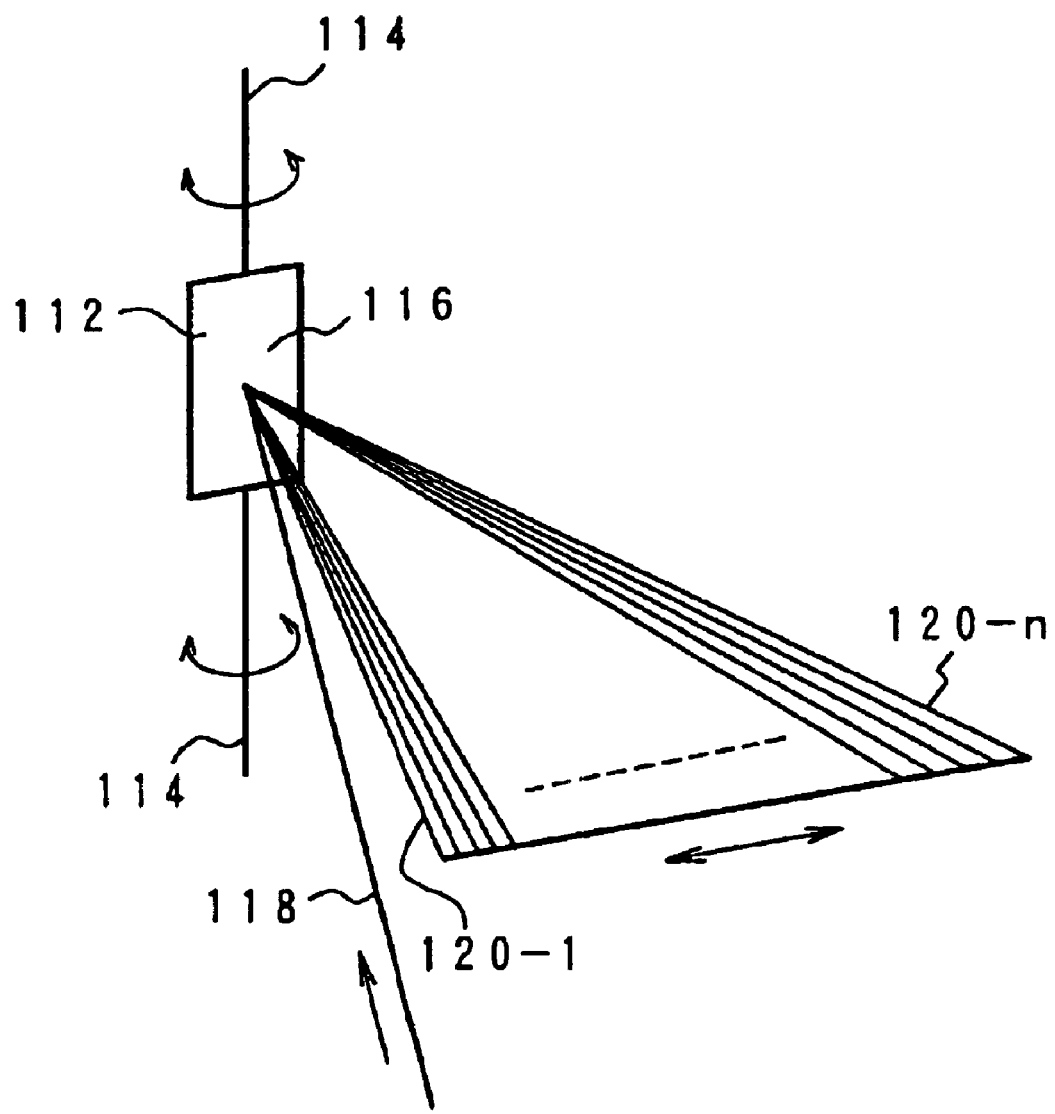
FIG. 13 is an explanatory diagram of a beam-of-light model creation on a movable mirror face.

FIG. 13 illustrates an optical axis model creation in case of using a movable mirror as an optical component. The movable mirror 112 swings around a vertically extending rotational axis 114 within a predetermined angular range. In case of setting an optical axis model 118 that is incident on the movable mirror 112, the angle of reflection is determined for each position of displacement of the rotational angle that is defined by a resolving power in a certain rotational angular range of the movable mirror 112. In addition, the input angle $\theta_i$ is determined by drawing a perpendicular line to a point of reflection 116 in the same manner as FIG. 12, whereby it is possible to automatically create an optical axis model 120-1 having an output angle $\theta_o$ that is equal to the input angle $\theta_i$. Similarly, for each mirror rotational angle $\theta$ there can be created n optical axis models 120-1 to 120-$n$ in different directions.

Referring again to FIG. 11, the polygon mirror 80 is in the shape of a regular hexagonal prism having six mirrors arranged on its periphery as shown in the three-dimensional optical model 46 of FIG. 6 for example, so that each of the six mirrors arranged on the periphery can act as a single rotary mirror through the rotations of the polygon mirror 80. Thus, similar to the case of the movable mirror of FIG. 13, the mirror face angle and position are determined for each mirror face relative to the rotational angle of the polygon mirror, with the result that a table structure is obtained as exclusively shown at right hand in FIG. 11. The mirror face angle and position are thereby automatically figured out from the rotational angle so that an optical axis model having an angle of reflection in the same direction as the input angle may automatically be created. Furthermore, the lens 82 stores optical functions of the $\theta$ lens 64 and the cylindrical lens 66 of FIG. 6 in the form of calculation expressions or table data so that an optical axis model output through application of the lens function is automatically created on the basis of the input optical axis model.

FIGS. 14A to 14C are explanatory diagrams of display and record of traces of arrival points at the final arrival face 68 of the three-dimensional optical model 46 appearing on the optical model simulation screen of FIG. 4. FIG. 14A depicts a letter "A" to be displayed on the final arrival face 68 through the control of the three-dimensional optical model 46 of FIG. 6. The letter "A" is binarized two-dimensionally with a predetermined resolving power so that aligned dots are displayed at arrival points as seen in FIG. 14B through a single horizontal scanning of the arrival points on the final arrival face 68 by one of the mirror faces of the polygon mirror 62. More specifically, during a single horizontal scanning on the final arrival face by the polygon mirror 62, a laser beam is subjected to emission control at dot positions of a horizontal line of the letter "A", whereas the laser beam is turned off at the other dot positions. By iterating this processing while moving the final arrival face 68 of FIG. 6 in a vertical direction with a predetermined resolving power, points P1 to Pn can be displayed as shown in FIG. 14B in the form of displays of arrival points where the optical axis models intersect the final arrival face. Three-dimensional coordinate values of the arrival points P1 to Pn can be recorded as arrival point coordinate data 122 as seen in FIG. 14C. In this case, all Z coordinate values in the depth direction are equally z1, with X and Y coordinate values varying as a function of dot positions. The arrival point coordinate data 122 are thus obtained and recorded into files so that dot data having coordinate values of the arrival point coordinate data 122 can be created in the enlarged display subwindow 54 on the optical model simulation screen 44 of FIG. 4 for example, thereby providing an enlarged display with a predetermined magnifying power. The print output unit 36 of FIG. 3 provides an output to the printer 42 on the basis of dot data having coordinate values of the arrival point coordinate data 122, to thereby allow letters or symbols appearing on the final arrival face 68 through simulations of the three-dimensional optical model 46 to be actually output as print results for verification.

FIGS. 15A and 15B are flowcharts of subroutines showing the details of the optical axis auto-creation processing shown in step S2 of FIG. 2, which can be implemented by control processing of the optical axis auto-creation unit 12 of FIG. 3. For this optical axis auto-creation processing, an optical axis auto-creation menu is incorporated in a basic menu on a work screen of the three-dimensional CAD 16 shown in FIG. 3. When an optical axis auto-creation menu is selected after reduction, into the optical component characteristic library 26, of the library data on the optical components used in the already created three-dimensional optical model to be processed, the optical axis auto-creation unit 12 of FIG. 3 is actuated to first display a setting screen for optical axis initial conditions in step S1. The optical axis initial conditions include the optical axis diameter, color, etc., of beams of light emitted from the light source. Then in step S2, a condition setting screen is displayed for optical path components of the three-dimensional optical model that are arranged between the light source and the final arrival face, and control parameters are set therein that are necessary for the respective optical path components. Then in step S3, with a setting screen for optical axis creation control conditions being displayed, there are set the maximum limit boundary wall model 74 of FIG. 8 defining the optical axis extension length, parameters for controlling the optical axis form, conditions for varying the optical axis relative to the length. After completion of such setting of all the conditions necessary for the optical axis creations, an instruction to initiate the optical axis creation is issued allowing the optical axis creation control unit 22 of FIG. 3 to create optical axis models in sequence from the light source toward the final arrival face to display optical axis models on the three-dimensional optical model 46 appearing on the display. In step S5 an initial operation check is made from this optical axis auto-creation, and if results desired by the designer are obtained, then the procedure advances to step S6 in which stepping control is verified. The stepping control is a control for allowing individual optical axis models to be displayed in sequence from the light source toward the final arrival face. If in step S7 a normal operation is judged for the optical axis model stepping control, then a continuous control is provided in step S8. The continuous control is a control for allowing all the optical axis models to be displayed from the light source toward the final arrival face to create a continuous trace of the optical axes. The continuous control includes a control providing control parameters for optical components, e.g., the amount of variation in rotational angle of the polygon mirror, to thereby allow a plurality of optical axis models from the light source to the final arrival face to be created and displayed. If in step S9 the continuous control is in normal operation, then it is judged in step S10 whether an instruction to print is present or absent. If the instruction to print is present, then in step S11 dot data are created on the basis of record results of coordinate values of the arrival points at the final arrival face and are print output to the printer. This enables the results of letters, symbols or the like obtained by three-dimensional optical model simulations to be checked in the form of print results. Then, if needed, repetition is instructed in step S12 so that the optical axis auto-creating operations are repeated from the step S1. On the other hand, if any abnormality is found out or no results desired by the designer are obtained in the initial operation check of step S5, the stepping control normal operation check of step S7, or the continuous control normal operation check of step S9, then the procedure advances to step S13. If not terminated, then the cause of abnormality is judged in step S14 so as to determine the position of restart among the steps S1 to S8 and to return to the restart position where necessary conditions or modifications are carried out previous to the repetition of the processing.

According to the present invention as set forth hereinabove, taking advantages of the three-dimensional CAD, it is possible to represent and three-dimensionally verify behaviors of beams of light most approximate to the actual object on the screen, through the pseudo three-dimensional optical model in place of the apparatus to be experimentally produced. In addition, all complicated calculation expressions are stored and executed as a library on the computer, so that it is possible to remarkably reduce the operator interventional portions, correctly grasp the optical behaviors at the stage of design examination, efficiently achieve the optimum optical structure design and save the costs and time to a great extent.

Furthermore, in case of the three-dimensional optical model of the apparatus intended for printing such as a printer, it is possible not only to display on the screen a trace formed on the final arrival face as a result of behaviors of the beams of light through the simulations, but also to print output the display results, whereby a pseudo check can be done that is equivalent to the case where the actual printer is experimentally produced for printing.

Although the object of design in the above embodiment has been the three-dimensional optical model of the laser printer optical system by way of example, the present invention is not limited thereto but is applicable intactly to any automatic design of apparatuses having an appropriate optical system such as an optical disk drive and an optical reader. It will also be appreciated that the present invention includes any appropriate variants without impairing its objects and advantages and that it is not restricted by the numerical values shown in the above embodiment.

What is claimed is:

1. An optical path simulation CAD system comprising:
   an optical model creation unit creating and allowing a display of a three-dimensional optical model in which one or more optical components are disposed on an optical path extending from a light source to a final arrival position; and
   an optical axis auto-creation unit figuring out, based on predetermined set parameters, a cylindrical optical axis model having a predetermined optical axis diameter and length indicative of behaviors of beams of light in said three-dimensional optical model, said optical axis auto-creation unit arranging and displaying said optical axis model in said three-dimensional optical model, for verification,
   wherein for said optical component(s) interposed between said light source and a final arrival position, said optical axis auto-creation unit creates output-side optical axis model(s) in conformity with optical functions of said optical component(s) from input optical axis model(s), to arrange said output-side optical axis model between said optical component and a next adjacent optical component or said final arrival position, and
   wherein in case said optical component lying on said optical path is a movable reflecting a mirror that is capable of swinging around a predetermined rotational axis, said optical axis auto-creation unit is able to designate as control parameters the position of said rotational axis and the angle of a reflection surface within a three-dimensional space, said optical axis auto-creation unit automatically creating and arranging reflected optical axis models from input optical axis models on the basis of said control parameters.

2. A system according to claim 1, wherein said optical axis auto-creation unit defines for said optical axis model, the optical axis diameter and the color of a beam of light emitted from said light source, said optical axis auto-creation unit creating and arranging as said optical axis model, a cylindrical shape having a length starting from said light source and ending in an input surface of a next adjacent optical component lying on said optical path.

3. A system according to claim 2, wherein
   said optical axis auto-creation unit varies the optical axis diameter of said optical axis model as a function of the distance from the starting point.

4. A system according to claim, 1, wherein
   in case said optical component lying on said optical path is a polygon mirror that has a plurality of mirror faces formed on its periphery and that rotates at a certain angular velocity, said optical axis auto-creation unit previously defines the structures of said plurality of mirror faces, figures out the positions of said mirror faces within a three-dimensional space and the angles of the reflection surfaces from mirror rotational angles, and automatically creates and arranges an optical axis model reflected on a specific mirror face from an input optical axis model.

5. A system according to claim 1, wherein
   in case said optical component lying on said optical path is a lens, said optical axis auto-creation unit previously defines optical functions of said lens and automatically creates an output-side optical axis model in conformity with said optical functions from an input optical axis model, to arrange said output-side optical axis model between said optical component and a next adjacent optical component or an image forming face.

6. A system according to claim 1, wherein
   said optical axis auto-creation unit provides a display of an optical axis ending point at a position where an optical axis model intersects said final arrival face, said optical axis auto-creation unit recording coordinates of said ending point into a file.

7. A system according to claim 1, wherein
   said optical axis auto-creation unit defines a boundary wall model indicative of an optical axis extension limit around said three-dimensional optical model, said optical axis auto-creation unit if said optical path has no final arrival position providing an ending point, setting the position of said boundary wall model which said optical axis model intersects as an ending point of an extended optical axis model.

8. A system according to claim 1, wherein
   said optical axis auto-creation unit previously defines time-sequential variations of control parameters of said optical components lying on said optical path extending from said light source to an image forming face, said optical axis auto-creation unit allowing said three-dimensional model to perform continuous actions in accordance with said time-sequential variations of said control parameters, to thereby display a desired ending point trace in the shape of a letter or a symbol on a final arrival face and to record coordinates of said ending point into a file.

9. A system according to claim 8, wherein said optical axis auto-creation unit converts coordinate values of said ending point coordinates recorded in said file, into dot data, for the output from a printer.

10. An optical path simulation method comprising:

creating and displaying a three-dimensional optical model in which one or more optical components are disposed on an optical path extending from a light source to a final arrival position;

calculating based on predetermined set parameters a cylindrical optical axis model having a predetermined optical axis parameter and length indicative of behaviors of beams of light in said three-dimensional optical model, to arrange and provide a display of said optical axis model in said three-dimensional optical model, for verification; and for said optical component(s) interposed between said light source and a final arrival position, creating outside-side optical axis model(s) in conformity with optical functions of said optical component(s) from input optical axis model(s), to arrange said output-side optical axis model between said optical component and a next adjacent optical component or said final arrival position, wherein in case said optical component lying on said optical path is a movable reflecting mirror that is capable of swinging around a predetermined rotational axis, it is possible to designate as control parameters the position of said rotational axis and the angle of a reflection surface within a three-dimensional space so that reflected optical axis models are automatically created, for arrangement, from input optical axis models on the basis of said control parameters.

11. A method according to claim 10, further comprising:

defining for said optical axis model, the optical axis diameter and the color of a beam of light emitted from said light source; and creating and arranging, as said optical axis model, a cylindrical shape having a length starting from said light source and ending in an input surface of a next adjacent optical component lying on said optical path.

12. A method according to claim 11 further comprising:

varying the optical axis diameter of said optical axis model as a function of the distance from the starting point.

13. A method according to claim 10, wherein in case said optical component lying on said optical path is a polygon mirror that has a plurality of mirror faces formed on its periphery and that rotates at a certain angular velocity, the structures of said plurality of mirror faces are previously defined so that the positions of said mirror faces within a three-dimensional space and the angles of the reflection surfaces are figured out from mirror rotational angles and so that an optical axis model reflected on a specific mirror face is automatically created, by arrangement, from an input optical axis model.

14. The method according to claim 10, wherein in case said optical component lying on said optical path is a lens, optical functions of said lens are previously defined so that an output-side optical axis model in conformity with said optical functions is automatically created from an input optical axis model and is arranged between said optical component and a next adjacent optical component or an image forming face.

15. A method according to claim 10, further comprising:

providing a display of an optical axis ending point at a position where an optical axis model intersects said final arrival face; and recording coordinates of said ending point into a file.

16. A method according to claim 12, further comprising:

defining a boundary wall model indicative of an optical axis extension limit around said three-dimensional optical model; and if said optical path has no final arrival position providing an ending point, setting the position of said boundary wall model which said optical axis model intersects as an ending point of an extended optical axis model.

17. A method according to claim 12, further comprising:

previously defining time-sequential variations of control parameters of said optical components lying on said optical path extending from said light source to an image forming face; and allowing said three-dimensional model to perform continuous actions in accordance with said time-sequential variations of said control parameters, to thereby display a desired ending point trace in the shape of a letter or a symbol on an image forming face and to record coordinates of said ending point into a file.

18. A method according to claim 17, further comprising:

converting coordinate values of said ending point coordinates recorded in said file, into dot data, for the output from a printer.

* * * * *

UNITED STATES PATENT AND TRADEMARK OFFICE
CERTIFICATE OF CORRECTION

PATENT NO.     : 6,826,519 B1
DATED          : November 30, 2004
INVENTOR(S)    : Hideki Fujino It is certified that error appears in the above-identified patent and that said Letters Patent is hereby corrected as shown below:

Column 16,
Lines 26 and 34, change "claim 12" to -- claim 10 --

Signed and Sealed this

Fifth Day of July, 2005

JON W. DUDAS
*Director of the United States Patent and Trademark Office*